United States Patent
Wang et al.

(10) Patent No.: US 9,985,734 B2
(45) Date of Patent: May 29, 2018

(54) WARNING CONTROL INFORMATION PROCESSING METHOD, WARNING INFORMATION RECEIVING METHOD, AND TERMINAL

(71) Applicant: ZTE Corporation, Shenzhen (CN)

(72) Inventors: Xingang Wang, Shenzhen (CN); He Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 303 days.

(21) Appl. No.: 14/409,590

(22) PCT Filed: Jul. 26, 2013

(86) PCT No.: PCT/CN2013/080204
§ 371 (c)(1),
(2) Date: Dec. 19, 2014

(87) PCT Pub. No.: WO2014/015833
PCT Pub. Date: Jan. 30, 2014

(65) Prior Publication Data
US 2015/0147958 A1    May 28, 2015

(30) Foreign Application Priority Data

Jul. 26, 2012    (CN) .......................... 2012 1 0261386

(51) Int. Cl.
*H04H 20/59*    (2008.01)
*H04H 20/71*    (2008.01)
(Continued)

(52) U.S. Cl.
CPC ............ *H04H 20/59* (2013.01); *H04H 20/71* (2013.01); *H04W 4/22* (2013.01); *H04W 4/06* (2013.01); *H04W 48/12* (2013.01)

(58) Field of Classification Search
CPC ......... H04H 20/59; H04H 20/71; H04W 4/22; H04W 76/007; H04W 76/002; H04W 48/12; H04W 52/0216; H04W 68/00
See application file for complete search history.

(56) References Cited

U.S. PATENT DOCUMENTS

2010/0075625 A1    3/2010    Wu
2011/0002250 A1    1/2011    Wang et al.
(Continued)

FOREIGN PATENT DOCUMENTS

CN    101594660 A    12/2009
CN    102137433 A    7/2011
(Continued)

OTHER PUBLICATIONS

3GPP, 3GPP TSG-RAN WG2 #64 R2-086674, 2008.*
(Continued)

*Primary Examiner* — James Yang
(74) *Attorney, Agent, or Firm* — Eversheds Sutherland (US) LLP (57) ABSTRACT

Embodiments of the present invention provide a method for processing warning control information, a method for receiving warning information, a terminal, and a base station. Wherein, the method for processing warning control information includes: a base station receiving warning information from a core network; and the base station notifying, through an RRC layer message, a UE of whether warning information broadcast in a cell changes or will change.

18 Claims, 2 Drawing Sheets

(51) Int. Cl.
*H04W 4/06* (2009.01)
*H04W 4/22* (2009.01)
*H04W 48/12* (2009.01)

(56) References Cited

U.S. PATENT DOCUMENTS

| | | | | |
|---|---|---|---|---|
| 2011/0090828 A1* | 4/2011 | Zhu | ............... | H04W 76/002 |
| | | | | 370/310 |
| 2011/0171929 A1* | 7/2011 | Tamura | ............... | H04W 48/12 |
| | | | | 455/404.1 |
| 2011/0237218 A1* | 9/2011 | Aoyama | ............... | H04H 20/59 |
| | | | | 455/404.1 |

FOREIGN PATENT DOCUMENTS

| | | |
|---|---|---|
| CN | 102149061 A | 8/2011 |
| EP | 2 166 784 A2 | 3/2010 |
| JP | 2010-263587 A | 11/2010 |
| WO | 2010/062534 A1 | 6/2010 |

OTHER PUBLICATIONS

3GPP, 3GPP TS 36.331 V8.4.0 (Dec. 2008).*
"3rd Generation Partnership Project; Technical Specification Group Radio Access Network; Evolved Universal Terrestrial Radio Access (E-UTRA) Radio Source Control (RRC); Protocol Specification (Release 9)," 3GPP TS 36.331, 2012.
JP Office Action for JP Application No. 2015-518837 dated Jan. 19, 2016 (4 pages).
Huawei, "Duplication Detection for ETWS Reception," 3GPP TSG-RAN WG2 #64, 2008, Prague, Czech Republic, XP050450896.
European Supplementary Search Report for EP Application No. 13 82 2541 dated May 20, 2015 (7 pages).
PCT International Search Report for PCT Application No. PCT/CN2013/080204 dated Oct. 31, 2013 (4 pages).

* cited by examiner

WARNING CONTROL INFORMATION PROCESSING METHOD, WARNING INFORMATION RECEIVING METHOD, AND TERMINAL

CROSS REFERENCE TO RELATED APPLICATIONS

This application claims the priority benefit of PCT/CN2013/080204 filed on Jul. 26, 2013 and Chinese Application No. 201210261386.2 filed on Jul. 26, 2012. The contents of these applications are hereby incorporated by reference in their entirety.

TECHNICAL FIELD

The present invention relates to a warning technology in a long thermal evolution system, and in particular, to a method for processing warning control information, a method for receiving warning information, a terminal and a base station.

BACKGROUND OF THE RELATED ART

A Public Warning System (PWS) provides public warning services to users. The PWS is comprises of two parts, i.e., an Earthquake and Tsunami Warning System (ETWS) and a Commercial Mobile Alert System (CMAS). The ETWS warning system notifies people that the earthquake and tsunami will come soon or of disaster relief information after the earthquake and tsunami disasters (such as notification of shelter locations); and the CMAS provides public security alert services (such as forest fires, terrorist attacks, etc.) to end users. Users who receive the alerts take actions according to the contents of the alerts to protect their life and property safety. The current mobile phone is a medium closest to people, and the PWS aids people in avoiding disasters or reducing losses due to disasters using such characteristics.

The Long Term Evolution (LTE) system transmits an ETWS primary notification through a SystemInformationBlockType10 (SIB10), an ETWS auxiliary notification through SystemInformationBlockType11 (SIB11) and a CMAS alert information through SystemInformationBlockType12 (SIB12); wherein the ETWS auxiliary notification and the CMAS alert need to be divided into a number of segments and then be respectively transmitted through the SIB11 and the SIB12 due to a long length of the message. The SIB12 transmits contents of a number of CMAS alert messages, which are transmitted at different times. In the transmission process, SIB12 segments for different alerts are not allowed to be overlapped, i.e., only after all SIB12 segments of one alert are transmitted completely, SIB12 segments of the next CMAS alert information can be transmitted. The SIB 11 is similar to the SIB12, and the difference therebetween is that the SIB12 transmits multiple CMAS alerts, and the SIB11 only transmits one ETWS warning.

SUMMARY OF THE INVENTION

After study, the applicant found that both a group of SIB11 segments and a group of SIB12 segments need to transmit multiple rounds, which will make a User Equipment (UE) to repeatedly receive acquired PWS warning information (an ETWS secondary notification and a CMAS warning are commonly referred to as a PWS warning hereinafter). If the UE has received the warning, the subsequent repeatedly received PWS is useless. The following several problems occur in the process of repeatedly acquiring the PWS warning information:

1. Useless warning information is received, which will make UE waste electricity;
2. The CMAS warning system requires the eNB to be able to transmit a lot of warning information at the same time and contents in each warning information are at most 9600 bytes, but the protocol does not specify an upper limit of the warning information which is transmitted at the same time. Assuming that the eNB transmits 10 warning information, in the most extreme cases, these useless warning information will occupy nearly 10K memory; and the processing of these warnings also need to occupy the chip processing capability, which is a serious challenge to the memory and chip of the UE;
3. The 36413 protocol specifies a concept of Repeat Period and Number of Broadcasts Requested for the PWS function. The eNB needs to transmit the segments of the PWS warning information one round every Repeat Period, and the transmission is repeated for Number of Broadcasts Requested rounds. A value range of the Repeat Period specified by the protocol is from 1 second to 217-1 seconds (36.41 hours). With respect to each PWS warning information, the UE needs to present the warning to users and release the memory applied by the warning only after receiving all SIB11/SIB12 segments of the warning. Due to poor wireless channels or measurement gaps etc., one or more segments are not received in the process of repeated transmission, and the UE must store these useless incomplete warnings, until all segments of the useless warnings are received. Assuming that 10 warnings each has contents of 9600 bytes and the Repeat Period is $2^{17}-1$ seconds, in extreme cases, it will result in nearly 100K memory being not able to be released with 36.41 hours and affecting normal services of the UE for a long time.

The embodiments of the present invention provide a method for processing warning control information, a method for receiving warning information, a terminal and a base station, to solve the problems of a waste of electricity, a waste of memory and failure of release of the memory for a long time due to repeated reception of useless warnings by the UE.

The embodiments of the present invention provide a method for processing warning control information, comprising:

a base station receiving warning information from a core network; and the base station notifying, through a Radio Resource Control (RRC) layer message, a UE of whether warning information broadcast in a cell changes or will change.

Preferably, the warning information is ETWS information, CMAS information or PWS information; and/or the RRC layer message comprises a System Information Block (SIB) and a paging message.

Preferably, the base station notifying, through a RRC layer message, a UE of whether warning information broadcast in a cell changes or will change comprises:

the base station notifying the UE of whether warning information broadcast in the cell changes or will change by setting an update identifier or setting different update identifiers corresponding to warnings of different types of warning information in the RRC layer message; or the base station notifying the UE of whether warning information broadcast in the cell changes or will change by setting information of warning segments being broadcast or to be broadcast in the cell in the RRC layer message.

Preferably, after the base station notifying the UE of whether warning information broadcast in the cell changes or will change by setting an update identifier or setting different update identifiers corresponding to warnings of different types of warning information in the RRC layer message, the method further comprises:

the base station setting a number of warning messages to be transmitted and/or information of warning segments in the RRC layer message; and the information of the warning segments comprises one or more pieces of the following information:

warning message categories, warning message identifiers, warning message serial numbers and warning information message segment numbers.

Preferably, the base station notifying the UE of whether warning information broadcast in a cell changes or will change comprises:

the base station notifying the UE of whether warning information broadcast in the cell changes in one or more of the following manners: the warning information is generated from none, a number of pieces of warning information changes, the warning information changes, and scheduling of a system information block carrying the warning information changes.

The embodiments of the present invention further provide a method for receiving warning information, comprising:

a User Equipment (UE) receiving a Radio Resource Control (RRC) layer message transmitted by a base station, wherein, one or more of the following pieces of information is set in the RRC layer message: information of warning segments being broadcast or to be broadcast in a cell, an update identifier, and one or more warning update identifiers corresponding to different types of warning information; and the UE judging whether the warning information changes according to the RRC layer message.

Preferably, the warning information is ETWS information, CMAS information or PWS information; and/or the RRC layer message comprises a System Information Block (SIB) and a paging message.

Preferably, the UE judging whether the warning information changes according to the RRC layer message comprises:

the UE reading and storing the update identifier or one or more warning update identifiers corresponding to the corresponding types of warning information in the RRC, and if determining that the update identifier or warning update identifiers read this time are different from those read in the last time, determining that the warning information changes, and if not, determining that the warning information does not change; or the UE reading information of the warning segments in the RRC, and judging whether the broadcast warning segments change according to the information.

Preferably, a number of warning messages to be transmitted is set in the RRC layer message; and when the warning information is the CMAS information, after the UE reads corresponding warning information, the method further comprises:

the UE judging whether all warning information is read according to the number of warning messages in the RRC layer message, and if not, continuing to read the warning information, until all warning information is read.

Preferably, the information of the warning segments comprises one or more pieces of the following information:

warning message categories, warning message identifiers, warning message serial numbers and warning information message segment numbers.

The embodiments of the present invention further provide a base station, comprising:

a reception module, configured to receive warning information from a core network; and a notification module, configured to notify, through a RRC layer message, a UE of whether warning information broadcast in a cell changes or will change.

Preferably, the warning information is ETWS information, CMAS information or PWS information; and/or the RRC layer message comprises a System Information Block (SIB) and a paging message.

Preferably, the notification module is configured to:

notify the UE of whether warning information broadcast in the cell changes or will change by setting an update identifier or setting different update identifiers corresponding to warnings of different types of warning information in the RRC layer message; or notify the UE of whether warning information broadcast in the cell changes or will change by setting information of warning segments being broadcast or to be broadcast in the cell in the RRC layer message.

Preferably, the notification module is further configured to set a number of warning messages to be transmitted and/or information of warning segments in the RRC layer message after setting an update identifier or setting different update identifiers corresponding to warnings of different types of warning information in the RRC layer message;

the information of the warning segments comprises one or more pieces of the following information:

warning message categories, warning message identifiers, warning message serial numbers and warning information message segment numbers.

Preferably, the notification module is configured to:

notify the UE of whether warning information broadcast in the cell changes in one or more of the following manners: the warning information is generated from none, a number of pieces of warning information changes, the warning information changes, and scheduling of a system information block carrying the warning information changes.

The embodiments of the present invention further provide a UE, comprising:

a reception module, configured to receive a RRC layer message transmitted by a base station, wherein, one or more pieces of the following information is set in the RRC layer message: information of warning segments being broadcast or to be broadcast in a cell, an update identifier, and one or more warning update identifiers corresponding to different types of warning information; and a processing module, configured to judge whether the warning information changes according to the RRC layer message.

Preferably, the warning information is ETWS information, CMAS information or PWS information; and/or the RRC layer message comprises a System Information Block (SIB) and a paging message.

Preferably, the processing module is configured to:

read and store the update identifier or one or more warning update identifiers corresponding to the corresponding types of warning information in the RRC, and if determining that the update identifier or warning update identifiers read this time are different from those read in the last time, determine that the warning information changes, and if not, determine that the warning information does not change; or read information of the warning segments in the RRC, and judge whether the broadcast warning segments change according to the information.

Preferably, a number of warning messages to be transmitted is also set in the RRC layer message; and when the warning information is the CMAS information, the processing module is further configured to judge whether all warning information is read according to the number of warning messages in the RRC layer message, and if not, continue to read the warning information, until all warning information is read.

Preferably, the information of the warning segments comprises one or more pieces of the following information:

warning message categories, warning message identifiers, warning message serial numbers and warning information message segment numbers.

In the embodiments of the present invention, a base station notifies a UE of whether warning information changes through a RRC layer message, and thereby the UE can determine whether to receive the corresponding warning information according to the received RRC layer message, thus well avoiding the problems of a waste of electricity, a waste of memory and failure of release of the memory for a long time due to repeated reception of useless warnings.

PREFERRED EMBODIMENTS OF THE PRESENT INVENTION

The embodiments of the present invention will be illustrated in detail hereinafter with respect to accompanying drawings. It should be illustrated that, in the case of no conflict, the embodiments of this application and the features in the embodiments could be combined randomly with each other.

An embodiment of the present invention provides a method for processing warning control information. The present embodiment will be described from a base station side perspective. The method comprises the following steps.

In step 11, a base station receives warning information from a core network;

wherein, the warning information may be ETWS information, CMAS information or PWS information.

In step 12, the base station notifies, through a RRC RRC layer message, a UE of whether warning information currently broadcast in a cell changes or will change.

Figure 1:
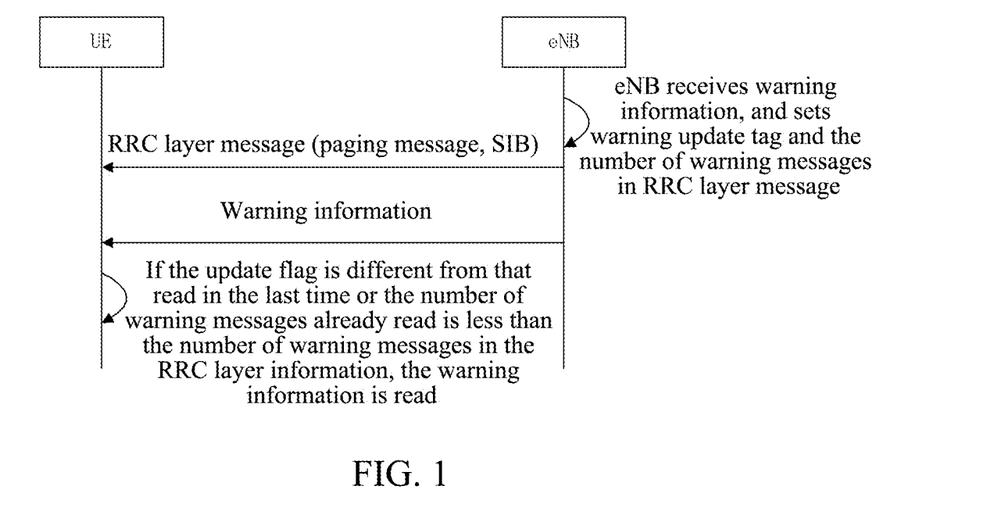
FIG. 1 is a flowchart of signaling of embodiment one of receiving and transmitting warning information between a base station and a UE according to the present invention.
Figure 2:
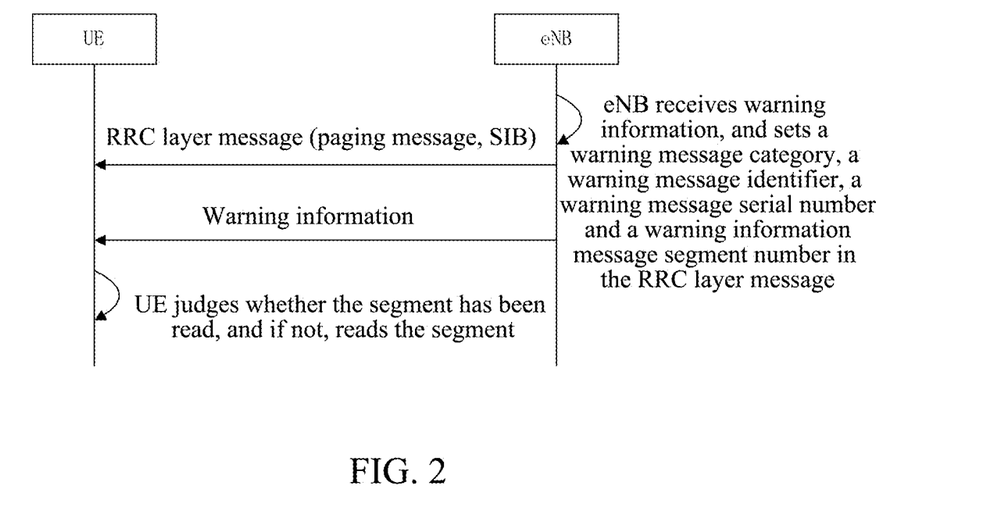
FIG. 2 is a flowchart of signaling of embodiment two of receiving and transmitting warning information between a base station and a UE according to the present invention.

The RRC layer message comprises a system information block and a paging message. The step 12 comprises the base station notifying the UE of whether warning information currently broadcast in the cell changes or will change by setting an update identifier or setting different update identifiers corresponding to warnings of different types of warning information in the RRC layer message, as shown in FIG. 1; or the base station notifying the UE of whether warning information currently broadcast in the cell changes or will change by setting information of warning segments being currently broadcast or to be broadcast in the cell in the RRC layer message. Wherein, the information of the warning segments comprises one or more pieces of the following information: warning message categories, warning message identifiers, warning message serial numbers and warning information message segment numbers, as shown in FIG. 2.

In addition, in FIG. 1, after setting an update identifier or setting different update identifiers corresponding to warnings of different types of warning information in the RRC, a number of warning messages to be transmitted may also be set in the RRC layer message.

Preferably, the base station notifies the UE of whether warning information currently broadcast in the cell changes in one or more of the following modes: the warning information is generated from none, a number of pieces of warning information changes, the warning information changes, and scheduling of a system information block carrying the warning information changes.

In the above method for processing warning control information, a base station transmits a RRC layer message to a UE, so that the UE determines whether to receive the corresponding warning information according to the RRC layer message, thus avoiding the problems of a waste of electricity, a waste of memory and failure of release of the memory for a long time due to repeated reception of useless warnings.

An embodiment of the present invention provides a method for receiving warning information. The present embodiment will be described from a UE side perspective. The method comprises the following steps.

In step 21, a UE receives a RRC layer message transmitted by a base station, wherein, one or more of the following information is set in the RRC layer message: information of warning segments currently being broadcast or to be broadcast in a cell, an update identifier, and one or more warning update identifiers corresponding to different types of warning information.

In step 22, the UE judges whether the warning information changes according to the RRC layer message.

The step 22 comprises the UE reading and storing the update identifier or one or more warning update identifiers corresponding to the corresponding types of warning information in the RRC, and if it is determined the update identifier or warning update identifiers read this time are different from those read in the last time, determining that the warning information changes, and if not, determining that the warning information does not change; or the UE reading information of the warning segments in the RRC, and judging whether the broadcast warning segments change according to the information, as shown in FIG. 2.

Figure 3:
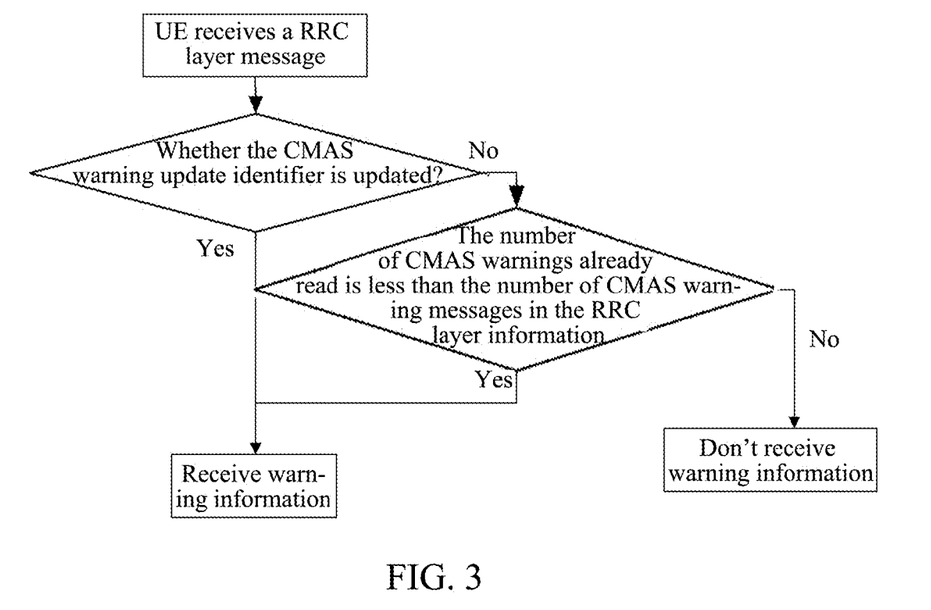
FIG. 3 is a flowchart of an embodiment of a UE side receiving warning information according to the present invention.

In addition, in FIG. 1, a number of warning messages to be transmitted is also set in the RRC layer message. When the warning information is the CMAS information, after the UE reads corresponding warning information, the method further comprises: the UE judging whether all warning information is read according to the warning message in the RRC layer message, and if not, continuing to read the warning information, until all warning information is read, as shown in FIG. 3.

In the above method for receiving warning information, a UE determines whether to receive the corresponding warning information according to the received RRC layer message, thus well avoiding the problems of a waste of electricity, a waste of memory and failure of release of the memory for a long time due to repeated reception of useless warnings.

The embodiments of the present invention will be described in detail below from interaction between a base station and a UE perspective.

Embodiment One

In the present embodiment, the ETWS warning changes, a valueTag mode is used.

Precondition: an etws-ValueTag field is set in the SIB1, an etws indication is reserved in Paging; and the process comprises the following steps.

In S101, there is no ETWS warning message to be transmitted by an eNB at present, the eNB receives an ETWS warning A including an ETWS auxiliary notification, and the eNB divides the warning A into SIB11-A0 and SIB11-A1;

in S102, the eNB sets the etws indication information in Paging, and transmits the Paging;

in S103, the eNB sets scheduling information of SIB11 in schedulingInfoList of the SIB1, and sets etws-ValueTag as 1 in the SIB1;

in S104, the eNB transmits the SIB1, SIB11-A0, SIB11-A1 and other system information according to a scheduling period;

in S105, the UE reads the paging according to occasions of the paging of itself, and finds that etws is indicated in the paging;

in S106, the UE reads the SIB1, acquires the scheduling information of SIB11 from schedulingInfoList, reads etws-ValueTag, and finds that it is not the same as null stored by itself;

in S107, the UE acquires the SIB11-A0 and SIB11-A1 according to the scheduling information of SIB11, and the UE stops reading the SIB11;

in S108, the UE reads the paging according to occasions of the paging of itself, and finds that etws is indicated in the paging, reads the SIB1, finds that etws-ValueTag is 1 and stores a value thereof;

in S109, the UE finds that etws-ValueTag is the same as that read the last time, judges that the ETWS is not updated, and does not read the SIB11;

in S110, the eNB receives ETWS warning B including an ETWS auxiliary notification when the warning message A has not ended, and the eNB divides the warning B into SIB11-B0, SIB11-B1 and SIB11-B2 to overlay the warning information A;

in S111, the eNB sets the etws indication in Paging, and transmits the Paging;

in S112, the eNB sets scheduling information of SIB11 in schedulingInfoList of the SIB1, and sets etws-ValueTag as 2 in the SIB1;

in S113, the eNB transmits the SIB1, SIB11-B0, SIB11-B1, SIB11-B2 and other system information according to a scheduling period;

in S114, the UE reads the paging according to occasions of the paging of itself, and finds that etws is indicated in the paging;

in S115, the UE reads the SIB1, acquires the scheduling information of SIB11 from schedulingInfoList, acquires etws-ValueTag of 2 from the SIB1, which is not the same as that stored by itself;

in S116, the UE acquires the SIB11-B0, SIB11-B1 and SIB11-B2 according to the scheduling information of SIB11, and the UE stops reading the SIB11; and in S117, the UE reads the SIB1, and finds that etws-ValueTag is indicated as 2 in the SIB1, which is the same as that stored by itself, and the UE does not read the warning information.

Embodiment Two

In the present embodiment, the ETWS warning changes, a valueTag mode is used.

Precondition: an etws-ValueTag field is set in the paging, an etws indication field is reserved in Paging; and the process comprises the following steps.

In S201, there is no ETWS warning message to be transmitted by an eNB at present, the eNB receives an ETWS warning A including an ETWS auxiliary notification, and the eNB divides the warning A into SIB11-A0 and SIB11-A1;

in S202, the eNB sets etws-ValueTag as 1 and sets the etws indication field in Paging, and transmits the Paging;

in S203, the eNB sets scheduling information of SIB11 in schedulingInfoList of the SIB1;

in S204, the eNB transmits the SIB1, SIB11-A0, SIB11-A1 and other system information according to a scheduling period;

in S205, the UE reads the paging according to occasions of the paging of itself, and finds that etws indication field is indicated in the paging which indicates that etws-ValueTag is 1 and stores a value thereof, which is not the same as null stored by itself;

in S206, the UE reads the SIB1, and acquires the scheduling information of SIB11 from schedulingInfoList;

in S207, the UE acquires the SIB11-A0 and SIB11-A1 according to the scheduling information of SIB11, and the UE stops reading the SIB11;

in S208, the UE reads the paging according to occasions of the paging of itself, finds that etws indication field is indicated in the paging, which indicates that the etws-ValueTag is 1, and stores a value thereof;

in S209, the UE finds that cmas-ValueTag is the same as that read the last time, judges that the ETWS is not updated, and does not read the SIB11;

in S210, the eNB receives ETWS warning B including an ETWS auxiliary notification when the warning message A has not ended, and the eNB divides the warning B into SIB11-B0, SIB11-B1 and SIB11-B2 to overlay the warning information A;

in S211, the eNB sets the etws indication field in Paging, sets the etws-ValueTag as 2, and transmits the Paging;

in S212, the eNB sets scheduling information of SIB11 in schedulingInfoList of the SIB1;

in S213, the eNB transmits the SIB1, SIB11-B0, SIB11-B1, SIB11-B2 and other system information according to a scheduling period;

in S214, the UE reads the paging according to occasions of the paging of itself, finds that etws indication field is indicated in the paging, which indicates that etws-ValueTag is 2, stores a value thereof, and finds that it is not the same as the etws-ValueTag of 1 stored by itself;

in S215, the UE reads the SIB1, and acquires the scheduling information of SIB11 from schedulingInfoList;

in S216, the UE acquires the SIB11-B0, SIB11-B1 and SIB11-B2 according to the scheduling information of SIB11, and the UE stops reading the SIB11; and in S217, the UE reads the paging according to occasions of the paging of itself, and finds that etws-ValueTag is indicated as 2 in the paging, which is the same as that stored by itself, and the UE does not read the warning information.

Embodiment Three

In the present embodiment, the CMAS warning changes, and a valueTag+unfinishedCmasMessageNumbe mode is used.

Precondition: a cmas-ValueTag field is set in the paging to overlay a cmas indication field, and an unfinishedCmasMessageNumber field is set in the SIB1. The process includes the following steps.

In S301, the eNB is transmitting warnings A and B, which are divided into SIB12-A0, SIB12-A1, SIB12-B0 and SIB12-B1, and cmas-ValueTag is 2;

in S302, the eNB receives a new CMAS warning message C (which is divided into SIB12-C0 and SIB12-C1) to substitute the warning message B, i.e., the eNB transmits warnings A and C;

in S303, the eNB sets cmas-ValueTag as 3 in the paging, and transmits the paging;

in S304, the eNB sets scheduling information of SIB12 in schedulingInfoList of the SIB1, and sets the unfinishedCmasMessageNumber as 2;

in S305, the eNB transmits SIB1, SIB12-A0, SIB12-A1, SIB12-C0, SIB12-C1 and other system information according to a scheduling period;

in S306, the UE reads the paging, finds that cmas-ValueTag is 3 which is not the same as the cmas-ValueTag of 2 stored by itself, knows that there occurs a CMAS update, and stores the new cmasValueTag;

in S307, the UE reads the SIB1, acquires scheduling information of the SIB12 from schedulingInfoList, and reads unfinishedCmasMessageNumber of 2;

In S308, the UE tries to read SIB12-A0, SIB12-A1, SIB12-C0 and SIB12-C1 according to the scheduling information of the SIB12. Due to reasons such as poor channel quality or GAP etc., the UE only reads SIB12-A0, SIB12-A1 and SIB12-C0, and does not read SIB12-C1, and judges that it further needs to read the warning information C in the next round of transmission of warnings according to the unfinishedCmasMessageNumber of 2;

in S309, the UE tries to read SIB12-A0, SIB12-A1, SIB12-C0 and SIB12-C1 according to the scheduling information of the SIB12, complements the warning information C, and stops reading SIB12 according to the unfinishedCmasMessageNumber of 2;

in S310, the UE reads the paging according to occasions of the paging of itself, finds that cmas-ValueTag is indicated as 3 in paging, and stores a value thereof;

in S311, the UE finds that cmas-ValueTag is the same as that read the last time, judges that there is no CMAS update, and does not read the SIB12.

Embodiment Four

In the present embodiment, the CMAS warning changes, and a valueTag+unfinishedCmasMessageNumbe mode is used.

Precondition: a cmas-ValueTag field and an unfinishedCmasMessageNumber field are set in the SIB1, a cmas indication is reserved in the paging. The process includes the following steps.

In S401, the eNB is transmitting warnings A and B, which are divided into SIB12-A0, SIB12-A1, SIB12-B0 and SIB12-B1;

in S402, the eNB receives a new CMAS warning message C (which is divided into SIB12-C0 and SIB12-C1) to substitute the warning message B, i.e., the eNB transmits warnings A and C;

in S403, the eNB sets a cmas-Indication, and transmits the paging;

in S404, the eNB sets scheduling information of SIB12 in schedulingInfoList of the SIB1, and sets the unfinishedCmasMessageNumber as 2 and cmas-ValueTag as 3;

in S405, the eNB transmits SIB1, SIB12-A0, SIB12-A1, SIB12-C0, SIB12-C1 and other system information according to a scheduling period;

in S406, the UE reads the paging, finds that the cmas-Indication of the CMAS warning is indicated therein;

in S407, the UE reads the SIB1, acquires scheduling information of the SIB12 from schedulingInfoList, reads unfinishedCmasMessageNumber of 2 and cams-ValueTag of 3, which is not the same as the cmas-ValueTag of 2 stored by itself, and reads the SIB12;

In S408, the UE tries to read SIB12-A0, SIB12-A1, SIB12-C0 and SIB12-C1 according to the scheduling information of the SIB12. Due to reasons such as poor channel quality or GAP etc., the UE only reads SIB12-A0, SIB12-A1 and SIB12-C0, and does not read SIB12-C1, and judges that it further needs to read the warning information C in the next round of transmission of warnings according to the unfinishedCmasMessageNumber of 2;

in S409, the UE tries to read SIB12-A0, SIB12-A1, SIB12-C0 and SIB12-C1 according to the scheduling information of the SIB12, complements the warning information C, and stops reading SIB12 according to the unfinishedCmasMessageNumber of 2;

in S410, the UE reads the SIB1, finds that cmas-ValueTag is indicated as 3 in the SIB1, and stores a value thereof;

in S411, the UE finds that cmas-ValueTag is the same as that read the last time, judges that there is no CMAS update, and does not read the SIB12.

Embodiment Five

In the present embodiment, the ETWS and the CMAS change together.

Precondition: an etws indication and a cmas indication are reserved in the paging, and etws-valuetag, cmas-Valuetag and unfinishedCmasMessageNumber are added in the SIB1. The process includes the following steps.

In S501, the eNB is transmitting CMAS warnings A and B, which are divided into SIB12-A0, SIB12-A1, SIB12-B0 and SIB12-B1; the eNB is transmitting an ETWS warning S, which is divided into SIB11-S1, and SIB11-S2; at this time, cmas-ValueTag is 2 and etws-ValueTag is 2 in the SIB1;

in S502, the eNB receives a new CMAS warning message C (which is divided into SIB12-C0 and SIB12-C1) to substitute the warning message B, the eNB receives a new ETWS warning D (which is divided into SIB11-D0 and SIB11-D1) to substitute the warning S; and the eNB transmits CMAS warnings A and C as well as an ETWS warning D (SIB11-D0, SIB11-D1, SIB12-A0, SIB12-A1, SIB12-C0 and SIB12-C1);

in S503, the eNB sets a cmas-Indication and an etws-Indication, and transmits the paging;

in S504, the eNB sets scheduling information of SIB11 and SIB12 in schedulingInfoList of the SIB1, and sets cmas-ValueTag as 3, etws-ValueTag as 3 and unfinishedCmasMessageNumber as 2;

in S505, the eNB transmits SIB1, SIB11-D0, SIB11-D1, SIB12-A0, SIB12-A1, SIB12-C0, SIB12-C1 and other system information according to a scheduling period;

in S506, the UE reads the paging, finds that the cmas-Indication and etws-Indication are indicated therein;

in S507, the UE reads the SIB1, acquires scheduling information of the SIB11 and SIB12 from schedulingInfoList, reads etws-ValueTag of 3 which is not the same as the etws-ValueTag of 2 stored by itself, reads SIB 11, and reads unfinishedCmasMessageNumber of 2 and cams-ValueTag of 3, which is not the same as the cmas-ValueTag of 2 stored by itself, and reads the SIB12;

In S508, the UE tries to read SIB11-D0, SIB11-D1, SIB12-A0, SIB12-A1, SIB12-C0 and SIB12-C1 according to the scheduling information of the SIB11 and SIB12. Due to reasons such as poor channel quality or GAP etc., the UE only reads SIB11-D0, SIB12-A0, SIB12-A and SIB12-C0, and does not read SIB11-D1 and SIB12-C1, and judges that it further needs to read the CMAS warning information C and ETWS warning information D in the next round of transmission of warnings according to the unfinishedCmasMessageNumber of 2;

in S509, the UE tries to read SIB11-D0 and SIB11-D1 according to the scheduling information of the SIB11, complements the warning information D, and stops reading the SIB11; and the UE tries to read SIB12-A0, SIB12-A1, SIB12-C0 and SIB12-C1 according to the scheduling information of the SIB12, complements the warning information C, and stops reading SIB12 according to the unfinishedCmasMessageNumber of 2;

in S510, the UE reads the SIB1, finds that etws-ValueTag is indicated as 3 and cmas-ValueTag is indicated as 3 in the SIB1, and stores values thereof;

in S511, the UE finds that etws-ValueTag and cmas-ValueTag are the same as those read the last time, judges that there is no ETWS and CMAS updates, and does not read the SIB11 and SIB12.

Embodiment Six

In this embodiment, detailed information of a CMAS message is identified in the SIB1.

Precondition: an etws indication and a cmas indication are reserved in the paging, a tetrad is added in the SIB1, which is a CMAS flag, a cmas message identifier, a cmas warning message serialNumber, a cmas warning information MessageSegmentNumber. The process includes the following steps:

in S601, there is CMAS warning information to be transmitted by an eNB, and the eNB receives CMAS warning information A and B;

in S602, the eNB transmits the warnings A and B, which are divided into SIB12-A0, SIB12-A1, SIB12-B0 and SIB12-B1;

in S603, the eNB sets a cmas indication, and transmits the paging;

in S604, the eNB sets scheduling information of the SIB12 in the schedulingInfoList of the SIB1;

in S605, when transmitting each segment, the eNB sets a warning message category, a warning message identifier, a warning message serial number and a warning information message segment number of the segment;

in S606, the UE reads the SIB1, and if the warning message category, the warning message identifier, the warning message serial number and the warning information message segment number in the SIB1 have not been read by the UE, the UE reads the warning segment; otherwise, the UE does not read the warning segment;

in S607, after the UE reads all segments SIB12-A0, SIB12-A1, SIB12-B0 and SIB12-B1, the UE stops reading the warning;

in S608, the UE reads the SIB1, finds that the warning indicated therein has been read, and does not read the warning.

Embodiment Seven

In this embodiment, detailed information of CMAS and ETWS messages is identified in the SIB1.

Precondition: an etws indication and a cmas indication are reserved in the paging, tetrads are added in the SIB1 respectively, which are [a CMAS flag, a cmas message identifier, a cmas warning message serialNumber, a cmas warning information MessageSegmentNumber]; and [an etws flag, an etws message identifier, an etws warning message serialNumber, an etws warning information MessageSegmentNumber]. The process includes the following steps:

in S701, there is CMAS and ETWS warning information to be transmitted by an eNB, and the eNB receives CMAS warning information A and B and ETWS warning information C;

in S702, the eNB transmits the CMAS warnings A and B, which are divided into SIB12-A0, SIB12-A1, SIB12-B0 and SIB12-B1; and the eNB transmits the ETWS warning C, which is divided into SIB11-C0 and SIB12-C;

in S703, the eNB sets a cmas indication and an etws indication, and transmits the paging;

in S704, the eNB sets scheduling information of the SIB11 and SIB12 in the schedulingInfoList of the SIB1;

in S705, when transmitting each ETWS segment, the eNB sets in the SIB1 a warning message category, a warning message identifier, a warning message serial number and a warning information message segment number of the segment; and when transmitting each CMAS segment, the eNB sets in the SIB1 a warning message category, a warning message identifier, a warning message serial number and a warning information message segment number of the segment;

in S706, the UE reads the SIB1, and if the etws warning message category, the etws warning message identifier, the etws warning message serial number and the etws warning information message segment number in the SIB1 have not been read by the UE, the UE reads the etws warning segment; otherwise, the UE does not read the etws warning segment; and if the cmas warning message category, the cmas warning message identifier, the cmas warning message serial number and the cmas warning information message segment number in the SIB1 have not been read by the UE, the UE reads the cmas warning segment; otherwise, the UE does not read the cmas warning segment;

in S707, after the UE reads all CMAS segments SIB12-A0, SIB12-A1, SIB12-B0 and SIB12-B1, the UE stops reading the CMAS warning; and after the UE reads all ETWS segments SIB11-C0 and SIB11-C1, the UE stops reading the ETWS warning;

in S708, the UE reads the SIB1, finds that the ETWS warning indicated therein has been read, and does not read the ETWS warning; and finds that the CMAS warning indicated therein has been read, and does not read the CMAS warning.

Figure 4:
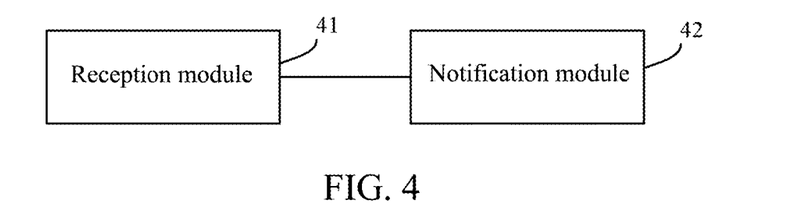
FIG. 4 is a structural diagram of an embodiment of a base station according to the present invention.

As shown in FIG. 4, illustrated is a structural diagram of an embodiment of a base station according to the present invention. The base station comprises a reception module 41 and a notification module 42, wherein, the a reception module 41 is configured to receive warning information from a core network; and the notification module 42 is configured to notify, through a Radio Resource Control (RRC) layer message, a User Equipment (UE) of whether warning information currently broadcast in a cell changes or will change.

Wherein, the above warning information is Earthquake and Tsunami Warning System (ETWS) information, Commercial Mobile Alert System (CMAS) information or Public Warning System (PWS) information; and/or the above RRC layer message comprises a system information block and a paging message.

Preferably, the notification module 42 is configured to notify the UE of whether warning information currently broadcast in the cell changes or will change by setting an update identifier or setting different update identifiers corresponding to warnings of different types of warning information in the RRC layer message; or notify the UE of whether warning information currently broadcast in the cell changes or will change by setting information of warning segments being currently broadcast or to be broadcast in the cell in the RRC layer message. Wherein, the information of the warning segments comprises one or more of the following information: warning message categories, warning message identifiers, warning message serial numbers and warning information message segment numbers.

In addition, the notification module 42 is further configured to set a number of warning messages to be transmitted and/or information of warning segments in the RRC layer message after setting an update identifier or setting different update identifiers corresponding to warnings of different types of warning information in the RRC layer message.

Preferably, the notification module 42 is configured to notify the UE of whether warning information currently broadcast in the cell changes in one or more of the following modes: the warning information is generated from none, a number of pieces of warning information changes, the warning information changes, and scheduling of a system information block carrying the warning information changes.

The above base station transmits a RRC layer message to a UE, so that the UE can determine whether to receive the corresponding warning information according to the RRC layer message, thus avoiding the problems of a waste of electricity, a waste of memory and failure of release of the memory for a long time due to repeated reception of useless warnings.

Figure 5:
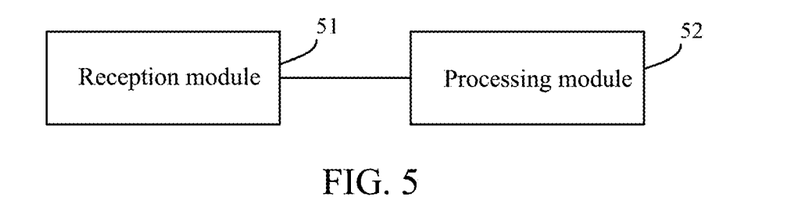
FIG. 5 is a structural diagram of an embodiment of a UE according to the present invention.

As shown in FIG. 5, illustrated is a structural diagram of an embodiment of a UE according to the present invention. The UE comprises a reception module 51 and a processing module 52, wherein, the reception module 51 is configured to receive a Radio Resource Control (RRC) layer message transmitted by a base station, wherein, one or more of the following information is set in the RRC layer message: information of warning segments being currently broadcast or to be broadcast in a cell, an update identifier, and one or more warning update identifiers corresponding to different types of warning information; and the processing module 52 is configured to judge whether the warning information changes according to the RRC layer message.

Wherein, the above warning information is ETWS information, CMAS information or PWS information; and the above RRC layer message comprises a system information block and a paging message.

Preferably, the processing module 52 is configured to read and store the update identifier or one or more warning update identifiers corresponding to the corresponding types of warning information in the RRC, and if it is determined the update identifier or warning update identifiers read this time are different from those read in the last time, determine that the warning information changes, and if not, determine that the warning information does not change; or read information of the warning segments in the RRC, and judge whether the current broadcast warning segments change according to the information. Wherein, the information of the warning segments comprises one or more of the following information: warning message categories, warning message identifiers, warning message serial numbers and warning information message segment numbers.

In addition, a number of warning messages to be transmitted is set in the RRC layer message. When the warning information is the CMAS information, the processing module 52 is further configured to judge whether all warning information is read according to the number of warning messages in the RRC layer message, and if not, continue to read the warning information, until all warning information is read.

The above UE determines whether to receive the corresponding warning information according to the received RRC layer message, thus well avoiding the problems of a waste of electricity, a waste of memory and failure of release of the memory for a long time due to repeated reception of useless warnings.

Figure 6:
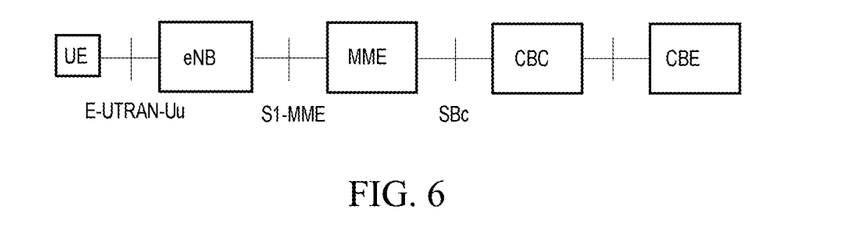
FIG. 6 is a structural diagram of an embodiment of a system for processing warning control information according to the present invention.

In addition, the embodiment of the present invention further provides a system for processing warning control information. As shown in FIG. 6, the system comprises a base station of a structure illustrated in FIG. 4 and a UE of a structure illustrated in FIG. 5. In addition, a relationship between the base station and a Cell Broadcast Entity (CBE), a Cell Broadcast Centre (CBC) and a Mobility Management Entity (MME) can be seen from FIG. 6.

A person having ordinary skill in the art can understand that all or a part of steps in the above method can be implemented by programs instructing related hardware, which can be stored in a computer readable storage medium, such as a read-only memory, a disk or a disc etc. Alternatively, all or a part of steps in the above examples can also be implemented by one or more integrated circuits. Accordingly, each module/unit in the above embodiments can be implemented in the form of hardware, or can also be implemented in the form of software functional module. The present invention is not limited to any particular form of a combination of hardware and software.

The above embodiments are only used to illustrate the technical schemes of the present invention instead of limiting the technical schemes, and the present invention is described in detail only with reference to preferable embodiments. A person having ordinary skill in the art can understand that modifications or alternatives can be made to the technical schemes of the present invention without departing from the spirit and scope of the technical schemes of the present invention, and all these corresponding modifications and alternatives should belong to the scope of the claims of the present invention.

INDUSTRIAL APPLICABILITY

In the embodiments of the present invention, a base station notifies whether warning information changes through a RRC layer message, and thereby the UE can determine whether to receive the corresponding warning information according to the received RRC layer message, thus well avoiding the problems of a waste of electricity, a waste of memory and failure of release of the memory for a long time due to repeated reception of useless warnings.

What is claimed is:

1. A method for processing warning information, comprising:
   a base station receiving warning information from a core network; and
   the base station notifying, through a Radio Resource Control (RRC) layer message, a User Equipment (UE) of whether warning information broadcast in a cell changes; wherein, one or more of the following pieces of information is set in the RRC layer message: information of warning segments being broadcast or to be broadcast in the cell, an update identifier, and one or more warning update identifiers corresponding to different types of warning information;
   wherein when the RRC layer message comprises the update identifier or one or more warning update identifiers corresponding to different types of warning information, the update identifier or one or more warning update identifiers are used for the UE to determine whether the update identifier or warning update identifiers read this time are different from those read in the last time, the UE determines that the warning information broadcast in the cell changes when the UE determines that the update identifier or warning update identifiers read this time are different from those read in the last time, and the UE determines that the warning information broadcast in the cell does not change when the UE determines that the update identifier or warning update identifiers read this time are same as those read in the last time;
   wherein a number of warning messages to be transmitted is also set in the RRC layer message; and
   when the warning information is Commercial Mobile Alert System (CMAS) information, after the UE reads corresponding warning information, the method further comprises:
   the UE judging whether all warning information is read according to the number of warning messages in the RRC layer message, and if not, continuing to read the warning information, until all warning information is read.

2. The method according to claim 1, wherein,
   the warning information is Earthquake and Tsunami Warning System (ETWS) information, Commercial Mobile Alert System (CMAS) information or Public Warning System (PWS) information; and/or
   the RRC layer message comprises a System Information Block (SIB) and a paging message.

3. The method according to claim 1, wherein,
   after the base station notifying the UE of whether warning information broadcast in the cell changes by setting in the RRC layer message an update identifier or setting different update identifiers corresponding to warnings of different types of warning information, the method further comprises:
   the base station setting a number of warning messages to be transmitted and/or information of warning segments in the RRC layer message; and
   the information of the warning segments comprises one or more pieces of the following information:
   warning message categories, warning message identifiers, warning message serial numbers and warning information message segment numbers.

4. The method according to claim 1, wherein,
   the base station notifying the UE of whether warning information broadcast in the cell changes comprises:
   the base station notifying the UE of whether warning information broadcast in the cell changes in one or more of the following manners: the warning information is generated from none, a number of pieces of warning information changes, the warning information changes, and scheduling of a system information block carrying the warning information changes.

5. The method according to claim 1, further comprising:
   the UE receiving the RRC layer message transmitted by the base station; and
   the UE judging whether the warning information broadcast in the cell changes according to the RRC layer message.

6. The method according to claim 5, wherein,
   the warning information is Earthquake and Tsunami Warning System (ETWS) information, Commercial Mobile Alert System (CMAS) information or Public Warning System (PWS) information; and/or
   the RRC layer message comprises a System Information Block (SIB) and a paging message.

7. The method according to claim 6, wherein,
   the UE judging whether the warning information changes according to the RRC layer message comprises:
   the UE reading and storing the update identifier or one or more warning update identifiers corresponding to the different types of warning information in the RRC, and if determining that the update identifier or warning update identifiers read this time are different from those read in the last time, determining that the warning information changes, and if not, determining that the warning information does not change; or
   the UE reading information of the warning segments in the RRC, and judging whether the warning segments broadcast change according to the information.

8. The method according to claim 7, wherein,
   the information of the warning segments comprises one or more pieces of the following information:
   warning message categories, warning message identifiers, warning message serial numbers and warning information message segment numbers.

9. A base station, comprising:
   a reception module, configured to receive warning information from a core network; and
   a notification module, configured to notify, through a Radio Resource Control (RRC) layer message, a User Equipment (UE) of whether warning information broadcast in a cell changes; wherein, one or more of the following pieces of information is set in the RRC layer message: information of warning segments being broadcast or to be broadcast in the cell, an update identifier, and one or more warning update identifiers corresponding to different types of warning information;
   wherein when the RRC layer message comprises the update identifier or one or more warning update identifiers corresponding to different types of warning information, the update identifier or one or more warning update identifiers are used for the UE to determine whether the update identifier or warning update identifiers read this time are different from those read in the last time, the UE determines that the warning information broadcast in the cell changes when the UE determines that the update identifier or warning update identifiers read this time are different from those read in the last time, and the UE determines that the warning information broadcast in the cell does not change when the UE determines that the update identifier or warning update identifiers read this time are same as those read in the last time;

wherein a number of warning messages to be transmitted is also set in the RRC layer message; and when the warning information is Commercial Mobile Alert System (CMAS) information, the number of warning messages in the RRC layer message is used for the UE to judge, after reading corresponding warning information, whether all warning information is read according to the number of warning messages in the RRC layer message, and if not, to continue to read the warning information, until all warning information is read.

10. The base station according to claim 9, wherein, the warning information is Earthquake and Tsunami Warning System (ETWS) information, Commercial Mobile Alert System (CMAS) information or Public Warning System (PWS) information; and/or the RRC layer message comprises a System Information Block (SIB) and a paging message.

11. The base station according to claim 9, wherein, the notification module is further configured to set a number of warning messages to be transmitted and/or information of warning segments in the RRC layer message after setting the update identifier or setting different update identifiers corresponding to warnings of different types of warning information in the RRC layer message;

the information of the warning segments comprises one or more pieces of the following information:

warning message categories, warning message identifiers, warning message serial numbers and warning information message segment numbers.

12. The base station according to claim 9, wherein, the notification module is configured to:

notify the UE of whether warning information broadcast in the cell changes in one or more of the following manners: the warning information is generated from none, a number of pieces of warning information changes, the warning information changes, and scheduling of a system information block carrying the warning information changes.

13. A system for processing warning information, comprising a base station and a User Equipment (UE), wherein the base station comprises:

a reception module, configured to receive warning information from a core network; and a notification module, configured to notify, through a Radio Resource Control (RRC) layer message, the UE of whether warning information broadcast in a cell changes; wherein, one or more of the following pieces of information is set in the RRC layer message: information of warning segments being broadcast or to be broadcast in the cell, an update identifier, and one or more warning update identifiers corresponding to different types of warning information;

wherein when the RRC layer message comprises the update identifier or one or more warning update identifiers corresponding to different types of warning information, the update identifier or one or more warning update identifiers are used for the UE to determine whether the update identifier or warning update identifiers read this time are different from those read in the last time, the UE determines that the warning information broadcast in the cell changes when the UE determines that the update identifier or warning update identifiers read this time are different from those read in the last time, and the UE determines that the warning information broadcast in the cell does not change when the UE determines that the update identifier or warning update identifiers read this time are same as those read in the last time;

wherein a number of warning messages to be transmitted is also set in the RRC layer message; and when the warning information is Commercial Mobile Alert System (CMAS) information, the number of warning messages in the RRC layer message is used for the UE to judge, after reading corresponding warning information, whether all warning information is read according to the number of warning messages in the RRC layer message, and if not, to continue to read the warning information, until all warning information is read.

14. The system according to claim 13, wherein the UE comprises:

a reception module, configured to receive the RRC layer message transmitted by the base station; and a processing module, configured to judge whether the warning information broadcast in the cell changes according to the RRC layer message.

15. The UE according to claim 14, wherein, the warning information is Earthquake and Tsunami Warning System (ETWS) information, Commercial Mobile Alert System (CMAS) information or Public Warning System (PWS) information; and/or the RRC layer message comprises a System Information Block (SIB) and a paging message.

16. The UE according to claim 15, wherein, the processing module is configured to:

read and store the update identifier or one or more warning update identifiers corresponding to the different types of warning information in the RRC, and if determining that the update identifier or warning update identifiers read this time are different from those read in the last time, determine that the warning information changes, and if not, determine that the warning information does not change; or read information of the warning segments in the RRC, and judge whether the warning segments broadcast change according to the information.

17. The UE according to claim 16, wherein, when the warning information is the CMAS information, the processing module is further configured to judge whether all warning information is read according to the number of warning messages in the RRC layer message, and if not, continue to read the warning information, until all warning information is read.

18. The UE according to claim 16, wherein, the information of the warning segments comprises one or more pieces of the following information:

warning message categories, warning message identifiers, warning message serial numbers and warning information message segment numbers.

\* \* \* \* \*